United States Patent [19]
Walter

[11] 3,715,642
[45] Feb. 6, 1973

[54] DC CONTROL CIRCUITS FOR DIRECT DRIVE MOTORS CONTINUOUSLY COUPLED TO SEWING MACHINES FOR CONTROLLING SEWING FUNCTIONS

[75] Inventor: Heinz E. Walter, Blankenloch, Buchig, Germany

[73] Assignee: The Singer Company, New York, N.Y.

[22] Filed: June 21, 1971

[21] Appl. No.: 155,082

[52] U.S. Cl. ................... 318/269, 318/375, 318/380
[51] Int. Cl. ............................................. H02p 3/12
[58] Field of Search ...... 318/269, 375, 380, 371, 275; 317/13 A

[56] References Cited

UNITED STATES PATENTS

| | | | |
|---|---|---|---|
| 3,320,507 | 5/1967 | Ford, Jr. et al. | 318/274 X |
| 3,582,739 | 6/1971 | Daab | 318/275 |
| 1,621,173 | 3/1927 | Rippl | 317/13 A |
| 3,597,669 | 8/1971 | Soltz | 318/371 |

*Primary Examiner*—Benjamin Dobeck
*Attorney*—Marshall J. Breen et al.

[57] ABSTRACT

A circuit is disclosed for controlling DC direct drive motors which are continuously coupled to a sewing machine drive shaft. A variable DC reference voltage is supplied by a foot pedal controller which in turn controls the output voltage of the power drive transistors which are coupled to the DC direct drive motor. A tachometer coupled to the motor shaft generates a feedback voltage which subtracts from the variable reference voltage, effectively reducing the reference voltage to maintain a constant motor speed. The maximum voltage and current applied to the motor is controlled at all times by a second feedback loop.

Automatic positioned stopping responsive to input commands is accomplished by a solenoid-actuated mechanical brake which is energized for a predetermined time by a special utilization circuit comprising a transistor which is turned on for a limited period determined by a capacitor discharge initiated by a position sensor pulse enabled by the input command. The drive circuits are disabled for the braking period to permit all mechanical actuation to cease before the machine can be restarted.

13 Claims, 3 Drawing Figures

DC CONTROL CIRCUITS FOR DIRECT DRIVE MOTORS CONTINUOUSLY COUPLED TO SEWING MACHINES FOR CONTROLLING SEWING FUNCTIONS

BACKGROUND OF THE INVENTION

This invention relates to sewing machine control circuits and more particularly, to a DC control circuit for a DC motor continuously coupled to the drive shaft of a sewing machine.

Electrical drive systems for sewing machines which utilize DC motors known in the prior art, frequently utilize silicon controlled rectifiers (SCR's) to change the AC input voltage to a direct current. Dynamic braking is conventionally applied by saturating an SCR placed in parallel with the armature winding of the motor. The inherent problems associated with SCR's e.g. misfiring, commutation, gating pulses, etc., require elaborate circuitry for proper operation.

Proportional DC control circuits which use transistors with a variable on to off time ratio to control the motor speed also require elaborate circuitry for proper operation. Frequently, these circuits utilize a technique whereby braking and running power are alternately, intermittently applied to the motor to control the motor speed.

The introduction of low-inertia, moving-coil, and surface wound armature DC motors in the past few years has led to the development of new improved systems for driving sewing machines. In these systems the DC motor is coupled directly and continuously to the sewing machine drive shaft without the aid of belts and pulleys. The new motors contain armatures of very low-inertia, such as copper coil or surface wound armatures which contain no iron and are immersed in a constant flux field preferably supplied by permanent magnets. A motor of this type is shown in the Swiggett U.S. Pat. No. 2,970,238. This type of motor has extremely low armature inductance and, as a consequence, exhibits an electrical time constant one or two orders of magnitude lower than that of conventional DC motors. The characteristics of such motors are high torque-to-inertia ratio, low inductance, no magnetic saturation, low voltage, and long brush life under running conditions.

The present embodiment of the invention provides the control circuitry which utilizes DC voltages to control DC motors which are continuously coupled to the sewing machine drive shaft without belts, pulleys or clutches. The motor contains a low-inertia armature immersed in a constant flux field and is journaled for simple rotary motion in suitable bearings. Rapid acceleration and control of the running speed is obtained solely by controlling with suitable transistor circuitry the DC voltage coupled to the armature of the motor. Rapid deceleration is obtained by reducing the voltage to the armature and further providing a dissipative load in parallel with the armature for dynamic braking. All operations are responsive to simple variations, of a reference voltage generated by an operater-actuated foot controller which functions as input command signals. The DC voltage drive to the motor is substantially reduced to zero and, at the same time, the dynamic brake is automatically applied when the motor speed is commanded to be slowed down or stopped.

In accordance with the principles of the present invention, the preferred embodiment provides a control system for driving a DC motor continuously coupled to the drive shaft of a sewing machine. The system being energizible from a commercial source of AC voltage and having means for changing the AC voltage to a variable DC voltage comprising; dynamic braking means for continuously braking the motor, having a coil and a pair of normally closed contacts, the coil being connected in series with the motor and the contacts being resistively coupled in parallel with the motor, power transistor means coupled in series with the motor and coil for providing a variable DC voltage to the serially connected motor and coil, limiting means coupled to the power transistor means for controlling the maximum value of the variable DC voltage, and control means coupled to the power transistor means including means operative in a forward position from a relaxed position for controlling the acceleration of the sewing machine motor and operative when permitted to return from a forward position to the relaxed position to automatically apply the dynamic braking.

Also included in this invention is a special utilization circuit for energizing a solenoid-actuated electromechanical brake for stopping the sewing machine in a predetermined angular position in response to controller commands. The stop position is determined by a position sensor which provides a voltage pulse to turn off a holding circuit for a relay which has previously provided a charging circuit for a capacitor. The release of the relay permits the capacitor discharge to furnish turn-on current to a transistor which provides energization of the brake solenoid for a predetermined time. An inhibit circuit prevents turn on of the power transistors for this time. This insures that the stopping cycle including the trimming function, when commanded, must come to an end before the machine can be restarted.

DESCRIPTION OF THE PREFERRED EMBODIMENT

Figure 1:
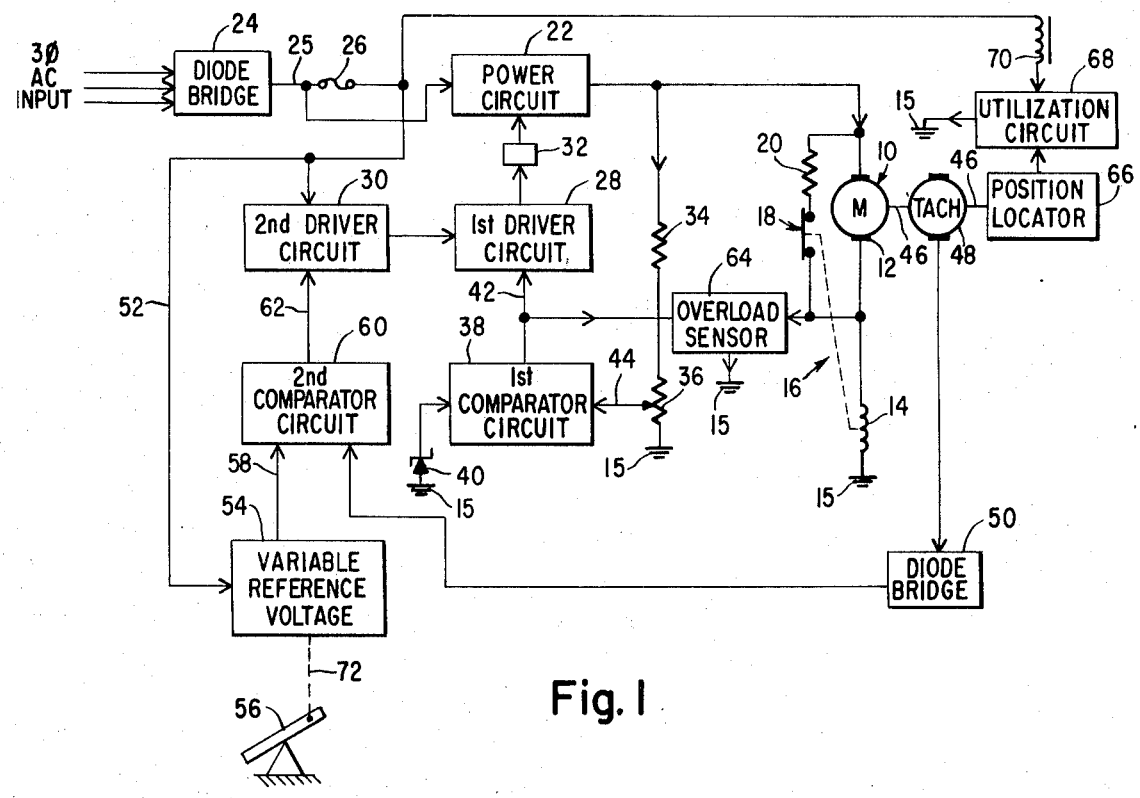
FIG. 1 is a functional block diagram of a DC motor control system utilizing the principles of the present invention.

Referring to the drawings, FIG. 1 is a functional block diagram of a complete DC control circuit for driving a DC motor 10 which is continuously coupled to the drive shaft of a sewing machine, not shown. In the preferred embodiment of the invention, the motor is of the permanent magnet type wherein the stator comprises permanent magnet poles, not shown, and the armature 12, being of the flat-wound printed circuit type is rotatably mounted within the constant flux field provided by the stator poles.

Coupled in series with the armature winding 12 is the coil 14 of the dynamic braking relay 16. The normally closed contacts 18 of the dynamic braking relay 16 are coupled by means of a resistor 20, (having a resistance value of the same order of magnitude as the armature resistance), across the armature 12. The DC driving voltage for the motor 10 is coupled to the series connection of the armature 12 and relay coil 14 through a power circuit 22, which in the present embodiment of the invention, is comprised of several transistors in parallel.

In the present embodiment of the invention, the source of power is commercially available 3 phase AC voltage. It is to be understood, however, that any AC voltage would be suitable as well as a DC voltage source of approximately 75 volts. The AC voltage is rectified by diode bridge 24 and changed to a DC voltage of approximately 75 volts, which is then coupled to the power circuit 22,.

The DC voltage from the diode bridge 24 appears from line 25 to a reference ground 15, and is coupled via fuse 26 to the first 28 and second 30 driver circuits which are coupled in series and function to provide the power circuit 22 with driving current.

A thermal overload sensor 32 is physically mounted in close proximity with the power circuit 22 and functions to remove the driving current to the transistors in the power circuit 22, in the event an excessive temperature rise of the transistor mounting surface occurs. Removing the driving current from the power transistors causes them to assume a high impedance state, thereby reducing the output voltage from the power circuit 22 to substantially zero. This will also reduce the current through the transistors and the armature 12 to substantially zero, stopping the motor and permitting the transistors and the mounting surface to cool, thereby preventing transistor burn-out.

A voltage divider sensing network comprised of a resistor 34 and a variable resistor 36 couples a portion of the voltage appearing across the serially connected armature 12 and relay coil 14 to a first comparator circuit 38. Also coupled to the first comparator circuit 38 in a Zener diode 40. The voltage appearing at the output of the first comparator circuit 38 is coupled, via line 42, to the first driver circuit 28. Since the first driver circuit 28 in conjunction with the power circuit 22 functions as an emitter follower amplifier, the voltage at the output of the first comparator circuit 38 is approximately equal to the voltage across the motor armature 12 and the dynamic braking relay coil 14 in series. The first comparator circuit insures that the voltage appearing at the wiper arm 44 of variable resistor 36 is equal to the voltage across the Zener diode 40 in a conventional closed loop manner. Adjusting the wiper arm 44 alters the voltage divider ratio of the sensing divider comprised of resistors 34 and 36, thereby providing a means for adjusting the maximum voltage across the armature 12, since the maximum voltage out of the power circuit 22 may be shown to be approximately equal to $1/k$ times the Zener diode voltage, where $K$ is the voltage divider ratio. This assumes that the second driver circuit 30 is in its low impedance state. With the wiper arm 44 at the top of the resistor 36 then $$K = R_{36} / R_{36} + R_{34}.$$

Mounted on the armature shaft 46 is a tachometer 48 which provides an AC voltage that is proportional to the motor speed. This voltage is rectified by a diode bridge 50 which changes it to a DC voltage. The 75 volts DC from diode bridge 24 is coupled, via line 52, to the variable reference voltage circuit 54. The output of the variable voltage circuit 54 is varied in accordance with the position of the operator-actuated foot pedal 56. The output voltage from the variable reference voltage is modified by the DC voltage from the diode bridge 50.

The variable reference voltage, which is of positive polarity in the present embodiment of the invention, is effectively summed with the voltage from diode bridge 50 and the output voltage from the variable voltage reference circuit 54, being the difference of these two DC voltages. The output of the second comparator circuit 60 is coupled, via line 62, to the second driver circuit 30. The output of the second comparator circuit is capable of changing the second driver circuit 30 from a low impedance state to a high impedance state and vice versa.

Sensing the voltage across the dynamic braking relay coil 14 is overload sensor circuit 64. If an excessive current is drawn by the armature 12 it will also flow through the coil 14, thereby increasing the voltage dropped across it. The overload sensor circuit 64 is adjusted to provide a low impedance path from the first driver circuit 28 to the ground reference 15. The overload sensor circuit 64 is a conventional flip-flop circuit and upon overload current being drawn by the armature will change states, thereby providing a low impedance path to ground 15. This will cause the output voltage of the first comparator circuit at line 42 to become substantially zero, thereby reducing the voltage across the armature 12 and the coil 14 to substantially zero. The overload sensor circuit 64 will remain in this state until the power is removed. When the power is reapplied, it will automatically revert to its normal state permitting operation of the control circuitry. Further included on the armature shaft 46 is a position locator 66 which functions in cooperation with position down and up sensors 76 and 78, to provide a voltage pulse related to the angular position of the armature shaft which is continuously and directly coupled to the sewing machine drive shaft. The needle position locator 66 is adjusted to relate to the position of the sewing machine needle.

A position locator device suitable for use with the preferred embodiment of the invention, is fully described in a concurrently filed copending application entitled "Position Signaling Device For Sewing Machine Driving Units", Ser. No. 151,664, filed June 10, 1971, and assigned to the same assignee as the present invention.

A utilization circuit 68 comprising transistor amplifier circuitry and an SCR, which prevents a double thread trimming operation, functions to provide a voltage to energize the electromechanical braking solenoid 70, thereby stopping the sewing machine needle in the position selected by the operator-actuated foot pedal 56.

In operation, the preferred embodiment of the control circuit functions in the following manner. The sewing machine is at rest with the foot pedal 56 in its relaxed position and the sewing machine needle in the needle down position. An operator, by pressing the foot pedal 56 in a forward direction (toe down), causes the foot pedal linkage 72 to rotate the multiple pole switch 74, shown in FIG. 3, in a clockwise direction which provides a DC voltage that is summed with the voltage obtained by means of the tachometer 48 and diode bridge 50. Since the motor 10 and, therefore, tachometer 48 which are mounted on a common shaft 46 are at rest, the voltage supplied by the tachometer 48 is equal to zero, and a positive voltage is coupled to the second comparator circuit 60 which becomes a relatively low impedance. The voltage appearing across the motor 10 and relay coil 14 in series is essentially zero at this time. Therefore, the first comparator circuit 38 has a high impedance and the first driver circuit 28 has a low impedance. The second driver circuit 30 is now able to control the power circuit 22 which changes to a low impedance, coupling nearly all of the DC voltage on line 25 to the motor 10. The instant the voltage increases across the motor 10, an increase in voltage appears at wiper arm 44 which is compared to the Zener diode 40 voltage in the first comparator circuit 38. The comparator circuit 38 reduces its impedance to a (maximum preset) value as explained earlier. The motor 10 and a relay coil 14 have a voltage across them of sufficient value to permit energization of relay 16, removing the dynamic load resistor 20 from across the armature 12, thereby permitting the motor to increase its speed. As the motor speed increases, the tachometer 48 provides an increasing AC voltage which is rectified by diode bridge 50 and is subtracted from the voltage provided at multiple pole switch 74. The second comparator circuit 60 couples the difference voltage obtained from summing the opposite polarity voltages from the diode bridge 50 and switch 74 and couples a continually reducing current proportional to the difference voltage to the second driver circuit 30. The impedance of the second driver circuit 30 continually increases, as the motor speed increases, and controls the current coupled to the power transistor circuit 22. If the voltage coupled to the motor is low for some reason, the first driver circuit 28 cannot supply any additional current beyond the value supplied by the second driver circuit 30. It is apparent, therefore, that the second driver circuit controls the running speed of the motor and the first driver circuit controls the maximum speed that the motor can run.

If the operator permits the foot pedal 56 to return to its relaxed position again, the variable reference voltage will be reduced to zero. This allows the negative voltage from the tachometer (since the motor continues to run for a short increment of time), to cause the second comparator and second driver circuits to assume a high impedance state (cut off), thereby preventing the power circuit 22 from receiving operating current. Without any operating current, the power circuit 22 becomes a high impedance, thereby causing all of the voltage from the diode bridge 24 to be dropped across it, leaving no voltage to appear across the motor and preventing current to flow in the armature 12 and the relay coil 14. With no current in the relay coil 14, the contacts 18 revert to its normally closed condition and couple resistor 20 in parallel with the armature 12 to provide dynamic braking. During slow down and responsive to a positioning circuit hereinafter described, the position locator 66 causes the position down sensor 76 (FIG. 3) to provide a pulse to the utilization circuitry 68 which, in turn, energizes the braking solenoid 70 to mechanically lock shaft 46 in the needle down position. Once the motor 10 and all mechanical elements are at rest the braking solenoid is de-energized and the motor may be started again.

To stop the sewing machine in a needle up position, the operator-actuated foot pedal is urged momentarily in a rearward position (heel down). This starts a cycle similar to the needle down stop cycle with the following additions. The needle down sensor 76 (FIG. 3) is deactivated and the needle up sensor 78 (FIG. 3) is permitted to provide the pulse used by the utilization means 68 to energize the electromechanical braking solenoid 70. In addition, the control circuit provides a time delay period in which a series of solenoids, not shown, may be energized to complete a thread trimming operation. A delay and safety circuit is provided to prevent multiple trimming steps which will be described in detail in conjunction with FIGS. 2 and 3.

Figure 2:
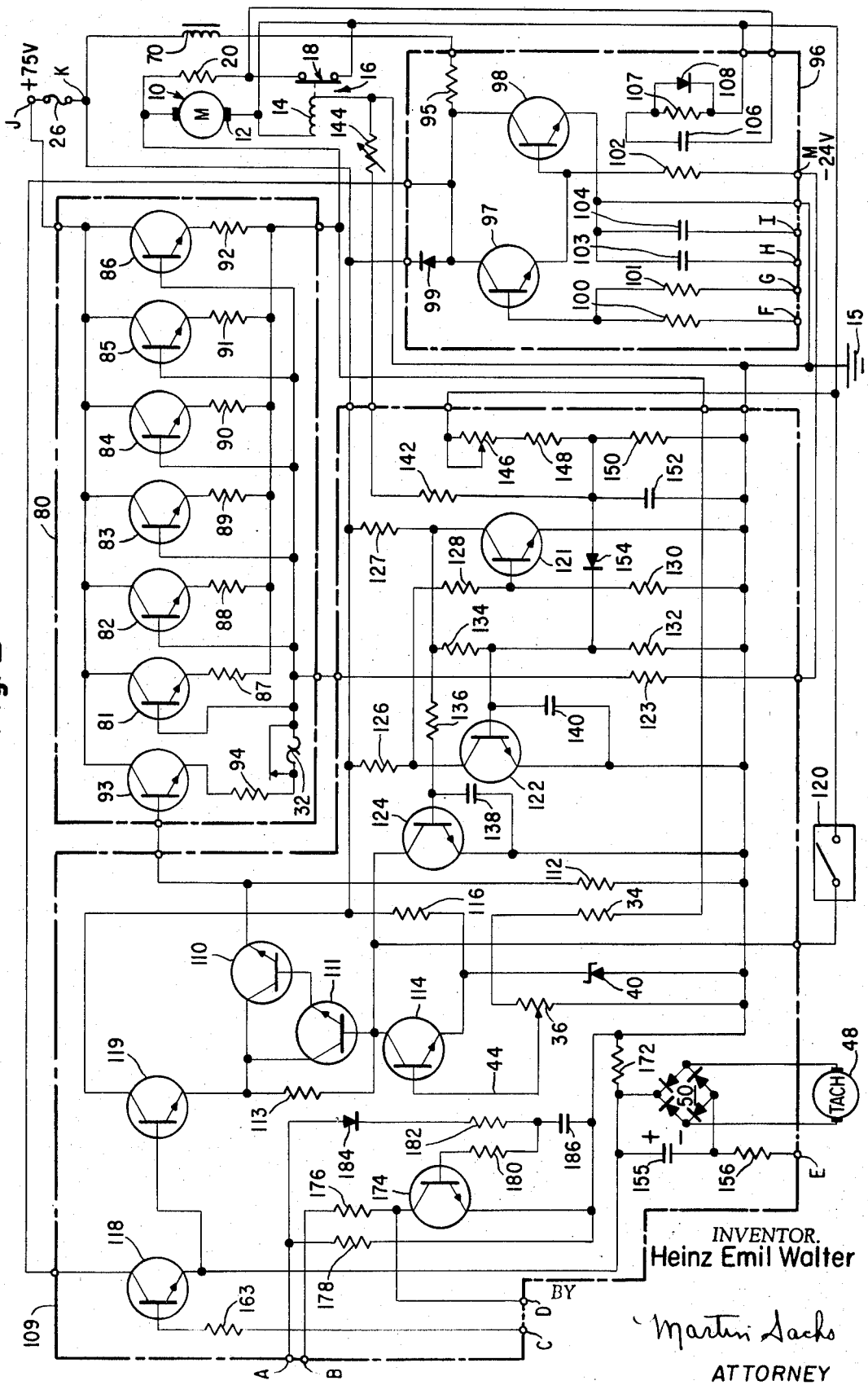
FIG. 2 is a schematic circuit diagram of part of the control system of a preferred embodiment of the invention.
Figure 3:
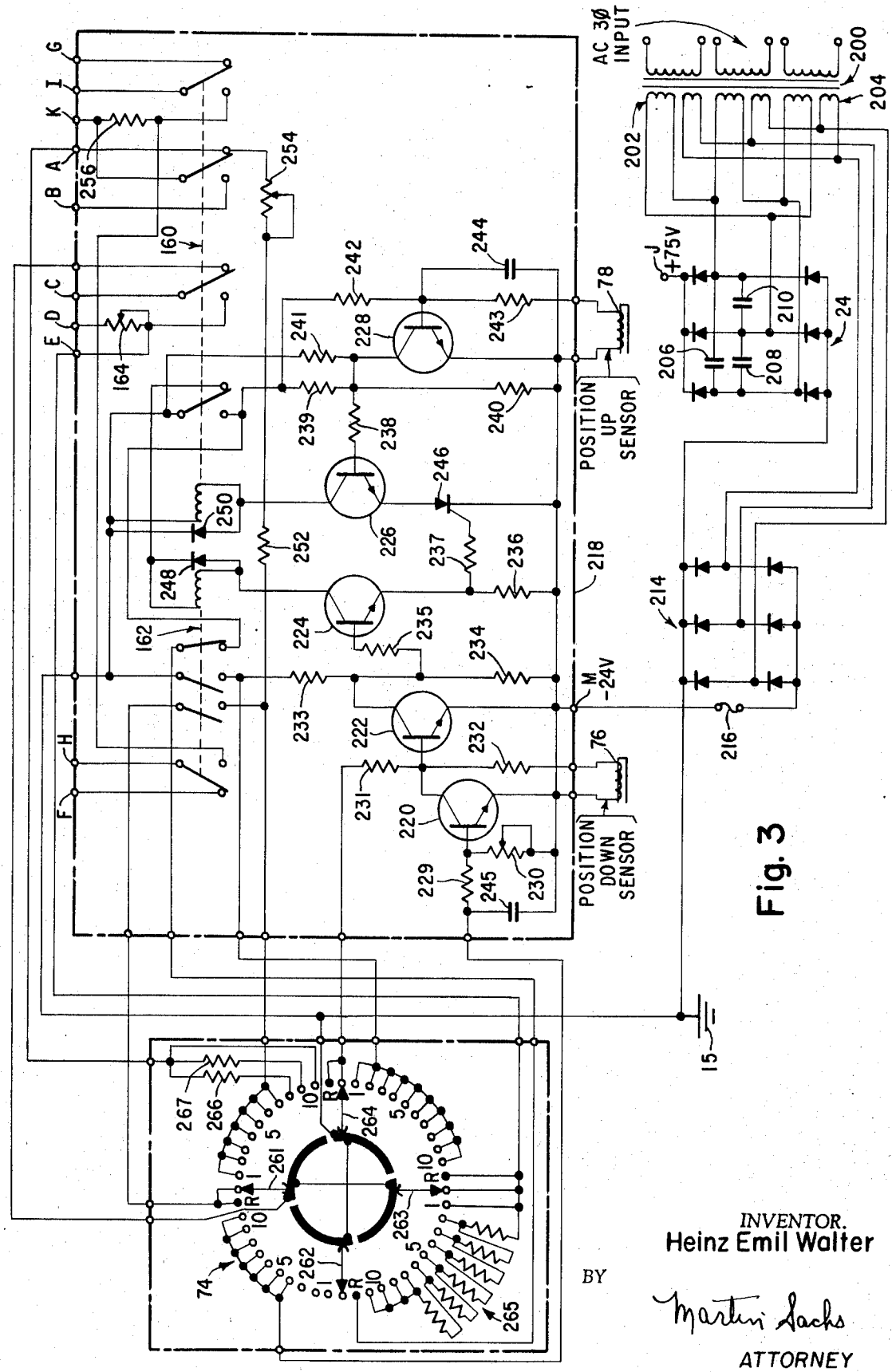
FIG. 3 is a continuation of the schematic circuit diagram shown in FIG. 2.

A complete schematic circuit diagram of the preferred embodiment of a DC control system utilizing the principles of the present invention is shown in FIGS. 2 and 3, wherein similar letters have been used in FIGS. 2 and 3 to denote common terminals or wiring connections between various points in the circuit.

The power circuit 22, in the preferred embodiment, is mounted on a cooling unit 80 and comprises parallel connected transistors 81 through 86, each of which has included therewith, emitter resistors 87 through 92 respectively, connected in a conventional manner to insure substantially equal apportionment of the armature 12 current. An additional transistor 93 having an emitter resistor, is connected as an emitter follower through the thermal overload sensor 32 to the base electrodes of transistors 81 through 86. The commonly connected collector electrodes of transistors 81 through 86 and 93 are coupled to the source of DC voltage, which in the preferred embodiment of the invention is approximately 75 volts,. As described earlier, an over-temperature condition will open sensor 32 and remove emitter electrode of transistor 93 to the parallel connected transistors 81 through 86. The common connection of emitter resistors 87 through 92 is connected to the armature winding 12 of motor 10 which, in turn, is coupled through the relay coil 14 to a ground reference point 15.

In the lower right hand corner of FIG. 2, is shown circuit board 96, which contains a portion of the utilization circuitry 68 (FIG. 1) comprised of transistors 97 and 98, diode 99, resistors 95, 100, 101, and 102, and capacitors 103 and 104. Capacitors 103 and 104; and resistors 101, 102, and 103, are associated with the energizing of the braking solenoid 70. Also on circuit board 96 is capacitor 106 connected in series with the parallel connection of resistor 107 and diode 108 which are connected across the contacts 18 of relay 16 to reduce arcing and increase the life of the relay. A positive voltage appearing on the base electrode of transistor 97 will cause the collector emitter electrodes of transistors 97 and 98 to become a low impedance causing current to flow from the +75 volts through fuse 26 and solenoid 70 to ground, thereby energizing the braking solenoid 70.

Circuit board 109 has mounted thereon, the first driver circuit transistor 110 and 111, which are connected in a Darlington configuration. The emitter of transistor 110 is connected to the base electrode of transistor 93, as well as a resistor 112 which provides a leakage current path for transistor 93. A biasing resistor 113 is connected between the collector and base electrodes of transistor 111.

The first comparator circuit 38, in the present embodiment of the invention, comprises transistor 114 which functions to compare the voltage across Zener diode 40 to its operating point, which is biased by resistor 116, to the voltage appearing on the wiper arm 44, which is coupled to the base electrode of transistor 114. The difference between these voltages changes the emitter-base electrode bias of transistor 114, thereby changing the current flow through the collector-emitter electrodes. This alters the current flow through resistor 113, thereby changing the voltage on the collector electrode of transistor 114 which is coupled to the base electrode of transistor 111, thereby controlling the current into the driver transistors 110 and 111.

The second driver circuit 30 (FIG. 1) in the present embodiment, is comprised of transistors 118 and 119 coupled as a conventional Darlington pair. The collector electrode of transistor 119 is coupled to the source of B+ (75 volts) through fuse 26, while the emitter electrode of transistor 119 is connected to the common connection of the collector electrodes of transistors 110 and 111; and resistor 113. The collector electrode of transistors 118 is coupled to B+ via resistor 95, the braking solenoid 70, and fuse 26. When transistor 98 is driven to its low impedance state to energize the electromechanical braking solenoid 70, the collector electrode of transistor 98 is at almost ground potential. This prevents transistor 118 from conducting current, since the voltage between its collector electrode and base electrode is reverse-biased, thereby prohibiting the drive voltage from being coupled to the motor 10. As long as the braking solenoid 70 remains energized, the motor 10 will not have any driving voltage applied to it. The diode 99 becomes back-biased at this time, and prevents shorting out of the B+ which is being used by the other circuits.

A mercury switch 120 is coupled from the base electrode of transistor 111 to relay coil 14 and functions to short the base electrode of transistor 111 to a low voltage point, thereby removing the motor drive voltage should the sewing machine be turned on its side.

Also included on circuit board 109 is resistor 123 which is coupled from the base electrode of transistor 81 to −24 volts and functions to provide a leakage current path for the power transistors 81 through 86.

Further includes on circuit board 109 is the overload sensor circuit 64 which is comprised of transistors 121, 122, and 124; resistors 126, 127, 128, 130, 132, 134, and 136; and capacitors 138 and 140. Transistors 121 and 122 and the associated resistors just mentioned form a conventional flip-flop circuit with transistor 121 in a normally low impedance state (on). The voltage across coil 14 is sensed by a voltage divider network comprising resistors 142, 144, 146, 148 and 150. Resistor 146 being of the variable type provides adjustment of the firing point of the flip-flop circuit comprised of transistors 121 and 122. Capacitor 152 provides filtering to prevent misfiring of the circuit. The voltage appearing across the coil 14 due to the current flowing through the motor armature 12 and the coil 14 is divided down by the voltage divider network and is coupled to the base electrode of transistor 122, which is normally in a high impedance state (off), via diode 154. A positive voltage at the base electrode of transistor 122 of sufficient magnitude will change transistor 122 to a low impedance state and by conventional flip-flop action, changes transistor 121 to a high impedance state. This in turn will couple a positive voltage via resistor 136 to the base electrode of transistor 124 which changes it from a high impedance to a low impedance. The low impedance state of transistor 124 places its collector electrode at essentially ground potential, thereby removing the current from the base electrode of transistor 111, which in turn, causes the power transistors to lose their drive current and become a relatively high impedance removing the drive voltage to the motor 10. The voltage to the control system must be turned off, then on, to reset the overload protection circuit.

The tachometer 46 generates an AC voltage which is proportional to the speed of the motor 10. This voltage is rectified by a diode bridge 50, filtered by a capacitor 155. The negative side of capacitor 155 is coupled via resistor 156, switch 74 (FIG. 3), relay 162 (FIG. 3), and resistor 163, to the base electrode of transistor 118. The positive side of capacitor 155 is connected to the commonly connected emitter electrode of transistor 118 and resistor 172. The other end of resistor 172 is connected to the ground reference 15.

Also included on circuit board 109 is transistor 174, resistors 176, 178, 180, and 182; diode 184, and capacitor 186, which operate in conjunction with relay 160 (FIG. 3) to provide a momentary run condition when the foot pedal 56 is urged in a rearward position from the relaxed stop condition, to obtain a needle up position.

Referring now to FIG. 3, the three phase input transformer 200 is shown with two sets of output windings 202 and 204 connected in a delta configuration in a conventional manner. Output winding 202 is coupled to diode bridge 24 which provides a DC voltage of approximately +75 volts with respect to ground 15. Across the diodes of bridge 24 are connected capacitors 206, 208, and 210 which remove the commutating spikes generated by the diodes when they change from their conducting to non-conducting states. A second diode bridge 214 is connected across the output winding 204, and provides approximately 24 volts DC with respect to ground. A fuse 216 is provided in the −24 volt line to protect the circuits from excessive currents.

The position sensing and associated circuitry are mounted on circuit board 218 with control relays 160 and 162 and comprise transistors 220, 222, 224, 226 and 228; resistors 229 through 243; capacitors 244 and 245; and silicon controlled rectifier (SCR) 246.

Diodes 248 and 250 are connected across the coils of relays 162 and 160 respectively. Resistors 252, 254 and 256 are utilized to adjust the voltage and currents to the proper values for operation of the control circuits.

The operator actuated foot pedal controller 56 is coupled by linkage 72 to multiple selector switch 74. Depressing the foot pedal 56 in a forward direction from the relaxed position simultaneously rotates the wiper arms 261 through 264 of multiple selector switch 74 in a clockwise direction from the relaxed position shown, to positions 1 through 10. Urging the foot pedal 56 in a rearward direction simultaneously rotates the wiper arms 261 through 264 towards position R and returns it to the relaxed or rest position shown in FIG. 3. Resistors 265 are connected in series with increasing resistance occurring when switching from positions 1 through 7 by wiper arm 263. Resistors 266 and 267 are shorted out or removed from the circuit forming a decreasing resistance path, as wiper arm 261 passes through positions 8, 9, and 10. Wiper arms 262 and 264 provide a circuit path to ground for the various terminals of the multiple position switch 74 as it is moved from the first to the tenth position.

The operating sequence of the relays and transistors is described below in conjunction with the various operating modes of the preferred embodiment of the invention, shown schematically in FIGS. 2 and 3.

It is also to be understood that a ganged arrangement of variable resistors performs equally as well, and may be substituted for the multiple position switch 74 shown in FIG. 3.

With the foot pedal 56 in its relaxed position, the sewing machine is at rest with the needle in the down position and the relays 160 and 162 and multiple position switch 74 is as shown in FIG. 3. Pressing the foot pedal 56 in a forward position rotates wiper arms 261, 262, 263 and 264 in a clockwise direction. The +75 volts at K in FIG. 3 is coupled through a normally closed contact of relay 160 through a resistance path including resistors 254 and 252, with or without resistors 266 and 267 in parallel depending on the position of the upper arm 261 of switch 74, through a second normally closed contact of relay 160, resistor 163 (FIG. 2) to the base electrode of transistor 118 (FIG. 2) which causes it to assume a low impedance state.

The voltage from the tachometer 48 is zero when it is at rest and builds up as the motor 10 increases in speed. The tachometer voltage is rectified by bridge 50 (FIG. 2) and filtered by capacitor 155 (FIG. 2). The positive side of capacitor 155 is connected to emitter electrode of transistor 118 (FIG. 2). The negative side of capacitor 155 is coupled via resistor 156, and additional resistors 265 depending on the position of wiper arm 263 of switch 74, a normally closed contact of relay 160, resistor 163 (FIG. 2) to the base electrode of transistor 118 (FIG. 2). (It is to be noted, therefore, that the positive current being supplied to the base electrode of transistor 118 by the +75 volts through the resistance values determined by the position of switch 74 has subtracted therefrom, the current being supplied by the tachometer 48.) Effectively then, the resultant DC voltage generated by the tachometer 48 is subtracted from the voltage supplied by the +75 volt variable reference. It is this difference that determines the impedance state of the emitter-collector electrodes of transistor 118 or its ability to permit current to flow from the +75 volts through the emitter-collector electrodes of the second driver transistor 119 and serially connected emitter-collector electrodes of the first driver transistor 110.

Without voltage being coupled to the motor 10 and coil 14 connected in series to ground 15, all the current carried by transistor 119 will be coupled via resistor 113 to the base electrode of transistor 111 causing it to assume a low impedance state. This will cause transistor 110 and 93 to do likewise, thereby supplying maximum drive current and voltage to the pass transistors 81 through 86 which will assume low impedance state and supply voltage to the motor and coil. The motor will operate driving the tachometer and the relay coil 14 will be energized removing the dynamic braking resistor from across the armature 12.

The maximum voltage coupled to the motor will be limited as described earlier, by the prior setting of the voltage sensing network comprised of resistors 34 and 36. A voltage at the wiper 44 which is greater than the Zener diode voltage, will cause transistor 114 to conduct current away from the base electrode of transistor 111, thereby successively lowering the drive current coupled to the power transistors and lowering the voltage across the motor until a stable condition is quickly reached.

The motor speed increases rapidly until the voltage generated by the tachometer reaches a point where the difference in the variable reference voltage (current) permits the motor to remain at the speed selected by the position of the foot pedal. Release of the foot pedal to a lower speed (toward the relaxed position) will back-bias the first and second driver circuits (28 and 30), and cut off the voltage and current from the motor. The relay 16 will become momentarily de-energized and the dynamic braking will be applied until the new lower speed is reached. As soon as the new speed is reached, voltage and current is reapplied to the motor and coil and the dynamic braking is released.

The wiper arm 264 of switch 74 supplies a ground to one end of resistor 233 which permits current to flow through resistors 233 and 234 from the −24 volt diode bridge 214. This biases transistor 224 on and relay 162 is energized and latched. Capacitor 103 (FIG. 2) is charged from the +75 volts via resistor 256. Transistor 224 also supplies current to resistor 236 which fires SCR 246. The current flowing in SCR 246 is limited to a value of insufficient magnitude to energize relay 160 by resistor 241.

To stop the sewing machine, the operator permits the foot pedal to return to its relaxed position. This supplies a ground to one side of resistor 231, causing current to flow through resistors 231 and 232 which biases transistor 222 to a point below its turn on point. The magnetic position locator 66, mounted on the armature shaft 46, completes a magnetic path when it passes over the air gap of the position sensor 76 and generates a voltage pulse which adds to the bias of transistor 222, thereby turning transistor 222 on, effectively shorting out the voltage appearing across the base-emitter electrodes of transistor 224. Transistor 224 will turn off, de-energizing relay 162. This causes that the connection between the contact of the rest position of switch 74 to contact 1 of the same switch is cut off via the contacts of relay 162 and in turn the positive voltage of the base electrode of transistor 118 is removed and transistor 118 is cut off and armature in turn de-energized. The DC voltage stored on capacitor 103 (FIG. 2) will be coupled via resistor 100 to the base electrode of transistor 97 turning it on as well as transistor 98. This will energize the braking solenoid 70 which will stop the sewing machine in the needle down position and remove the current drive to the power transistors by back-biasing the second driver transistor 118 as described earlier. The electromechanical braking solenoid 70 will remain energized a predetermined time until capacitor 103 discharges and transistors 97 and 98 return to their off states. The sewing machine cannot be restarted during this time period even if commanded to do so.

To stop the sewing machine with the needle in the up position, the operator must momentarily urge the foot pedal 56 rearward. Switch 74 will momentarily move counterclockwise toward R. A ground connection is applied via wiper 262, and a normally closed contact of relay 162 to one end of resistor 239 and 242. The current is now permitted to flow from −24 volts through resistors 239 and 240; and 242 and 243. The current through resistors 242 and 243 bias transistor 228 to a point which almost turns it one. The current through resistors 239 and 240 biases transistor 226 full on with resistor 239 supplying enough current to the base electrode of transistor 226 to allow sufficient current to permit the SCR to turn on full, thereby energizing relay 160 and latching it. Relay 160 being energized in combination with transistor 174 and its associated resistors; and switch 74, allows the motor to run at a slower speed for a short time, by changing the resistor values cooperating with the tachometer and variable reference voltages. Capacitor 104 (FIG. 2) is permitted to charge to a positive voltage from the +75 volts through resistor 256 and a contact of relay 160.

When the magnetic position locator 66, which is mounted on armature shaft 46, reaches position sensor 78, it closes the air gap of sensor 78, generating a pulse which is added to the bias on the base electrode of transistor 228, turning it on. The current flowing through resistor 239 and 241 into the base electrode of transistor 226 is bypassed by transistor 228, turning off transistor 226 which, in turn, causes the SCR 246 to turn off, since it now carries less than holding current. Relay 160 becomes de-energized and cannot be energized again until the foot pedal 56 is pressed in a forward direction. This protection feature is accomplished by keeping transistor 224 off, thus eliminating the voltage to the gate of SCR 246 because transistor 222 is on by virtue of wiper arm 264 coupling a ground to one end of resistor 231.

It is to be noted that repeated urging of the foot pedal rearward will not change the state of the transistor or relays. Also, to be noted, is that a conventional thread cutting mechanism may be attached to the control circuitry, since the preferred control circuitry provides the sequencing and a positive DC voltage, via point B (FIG. 3), with a relatively long time constant.

Capacitor 104 which has been positively charged by virtue of relay 160 being energized, is not discharged upon de-energization of relay 160 through resistor 101 (FIG. 2), and the base-emitter electrode of transistor 97. Transistor 97 turns on with transistor 98, completing the current path and energizing the electromechanical braking solenoid 70, thereby stopping the machine in the needle up position. The time constant of capacitor 104 and resistor 101 is long enough to permit all moving mechanical parts to come to rest and permits activation of the thread cutting mechanism when used.

From the above, it will be apparent that in accordance with this invention, there is provided a DC control system necessary to control the automatic driving and angular positional stopping of a sewing machine in a selected position (s) responsive to selected positions of an operator-actuated foot pedal.

While the invention has been described by means of a specific embodiment, it is not intended to be limited thereto, and obvious modifications will occur to those skilled in the art without departing from the spirit and scope of the invention.

Having thus set forth the nature of the invention what I claim is:

1. A control system for driving a DC motor continuously coupled to the drive shaft of a sewing machine, the system being energizable from a commercial source of AC voltage and having means for changing the AC voltage to a DC voltage comprising:
   a. dynamic braking means for continuously braking said motor, having a coil and a pair of normally closed contacts, said coil being connected in series with said motor and said contacts being resistively coupled in parallel with said motor;
   b. electromechanical braking means mounted on said sewing machine drive shaft for braking said shaft for a predetermined time interval;
   c. power transistor means coupled in series with said motor and coil for providing a variable driving DC voltage to said serially connected motor and coil;
   d. limiting means coupled to said power transistor means for controlling the maximum value of said variable DC voltage; and
   e. control means coupled to said power transistor means operative in a forward position from a relaxed position for controlling the acceleration of said sewing machine motor and operative when permitted to return from a forward position to said relaxed position to automatically apply said dynamic braking means and said electromechanical braking means.

2. A control system for driving a DC voltage continuously coupled to the drive shaft of a sewing machine according to Claim 1 further including solid state overload protection means coupled to said power transistor means for sensing the current drawn by said motor and causing said variable DC voltage to be reduced to substantially zero upon excess current being drawn by said motor.

3. A control system for driving a DC motor according to claim 1 further including:
   a. permanent magnet locating means rotatably mounted on said drive shaft, said magnet being adjustable relative to the angular position of said drive shaft; and
   b. utilization means cooperating with said permanent magnet locating means for energizing said electromechanical brake means in a preselected angular position of said drive shaft for said predetermined time interval.

4. A control system according to claim 3 further including:
   a. a transistor for energizing said electromechanical brake;
   b. capacitor means charged during the running period of said motor; and c. means responsive to said control means for permitting said capacitor means to discharge through said transistor to turn it on for a predetermined time to energize said electromechanical brake.

5. A control system according to claim 4 further including:
   a. relay means;
   b. transistor means for energizing said relay means during the running period of said motor;
   c. means responsive to movement of said control means to a relaxed position for preparing a circuit for turn-off of said transistor means to de-energize said relay means;
   d. said actual turn-off being conditioned responsive to a positioning pulse generated by said permanent magnet sensing means in a predetermined angular position of said drive shaft.

6. A control system according to claim 5 wherein the deenergization of said relay means initiates the times energization of the electromechanical brake.

7. A control system according to claim 6 further including means responsive to the energization of the electromechanical brake for inhibiting the application of driving DC voltage to said motor during said energization.

8. A control system according to claim 7 wherein said drive shaft is stopped in an angular position corresponding with the needle of said sewing machine being positioned needle-down when said control means is in said relaxed position and said drive shaft is stopped in an angular position corresponding with the needle of said sewing machine being positioned needle-up when said control means is momentarily urged to a rearward position from said relaxed position.

9. A control system for starting, running and braking a DC motor continuously coupled to the drive shaft of a sewing machine and fed from an AC voltage source and having means for changing the AC voltage to a DC voltage comprising, transistor drive means for supplying a controlled variable DC voltage for running said motor, first braking means having an energizing coil, for connecting a dissipative electrical load to said motor to provide dynamic braking, said energizing coil being connected in series with the armature of said DC motor, second braking means including an electromechanical brake for applying frictional forces to the drive shaft for a predetermined time interval and control means operative in a forward position from a relaxed position for controlling the acceleration of said sewing machine and operative when permitted to return from a forward position toward said relaxed position to automatically energize said first and second braking means.

10. A control system for driving a DC motor having an armature continuously coupled to the drive shaft of a sewing machine, said system being energizable from a commercial source of AC voltage and having means for changing the AC voltage to a DC voltage comprising:
   a. dynamic braking means for continuously braking said motor, having a coil and a pair of normally closed contacts, said coil being connected in series with said armature and said contacts being resistively coupled in parallel with said armature;
   b. electromechanical braking means mounted on said sewing machine drive shaft for braking said shaft for a predetermined time interval;
   c. power transistor means coupled in series with said armature and coil for providing a variable voltage to said serially connected armature and coil;
   d. first and second transistor driver means connected in series and coupled to said power transistor means;
   e. control means coupled to said first transistor driver means for limiting the maximum DC voltage provided by said power transistor means; and
   f. operator actuated control means coupled to said second transistor driver means operative in a forward position from a relaxed position providing a variable DC reference voltage for controlling the acceleration of said sewing machine and operative when permitted to return from a forward position toward said relaxed position to automatically energize said dynamic braking means and said electromechanical braking means.

11. A control system for driving a DC motor according to Claim 10 further including:
   a. permanent magnet locating means rotatably mounted on said drive shaft, said magnet being adjustable relative to the angular position of said drive shaft; and
   b. utilization means cooperating with said permanent magnet locating means for energizing said electromechanical braking means in a preselected angular position of said drive shaft for said predetermined time interval.

12. A control system according to claim 11 wherein said permanent magnet locating means is positioned to stop said drive shaft in an angular position corresponding with the needle-down position when said operator actuator control means is in said relaxed position and said permanent magnet locating means is positioned to stop said drive shaft in an angular position corresponding with the needle-up position when said operator actuated control means is momentarily urged to a position rearward from said relaxed position.

13. A control system for starting, running and stopping a sewing machine in selected needle positions, comprising:
   a. a DC motor having an armature coupled directly and continuously to the drive shaft of said sewing machine;
   b. means including power transistors for supplying a variable DC voltage to said armature;
   c. means including a variable reference voltage and a tachometer generator for controlling and regulating the drive to said power transistors.
   d. a controller having different positions for adjusting said reference voltage and having associated switching circuits providing input commands;
   e. a switching relay;
   f. first means responsive to said controller position for energizing said relay during running of said motor;
   g. second means responsive to said controller position for de-energizing said relay when said sewing machine is in a predetermined needle position;
   h. capacitor means charged during the energized condition of said relay;
   i. means initiating the discharge of said capacitor when said relay is de-energized;
   j. electromagnetic brake means for frictionally braking said drive shaft;

k. means responsive to said capacitor discharge current to energize said electromagnetic brake means for a predetermined period; and
l. means for inhibiting the drive to the power transistors during the energization period of the brake.

* * * * *